Feb. 16, 1954  F. A. LA FEMINA  2,669,028
GEAR CHECKING DEVICE
Filed Oct. 12, 1945  2 Sheets-Sheet 1
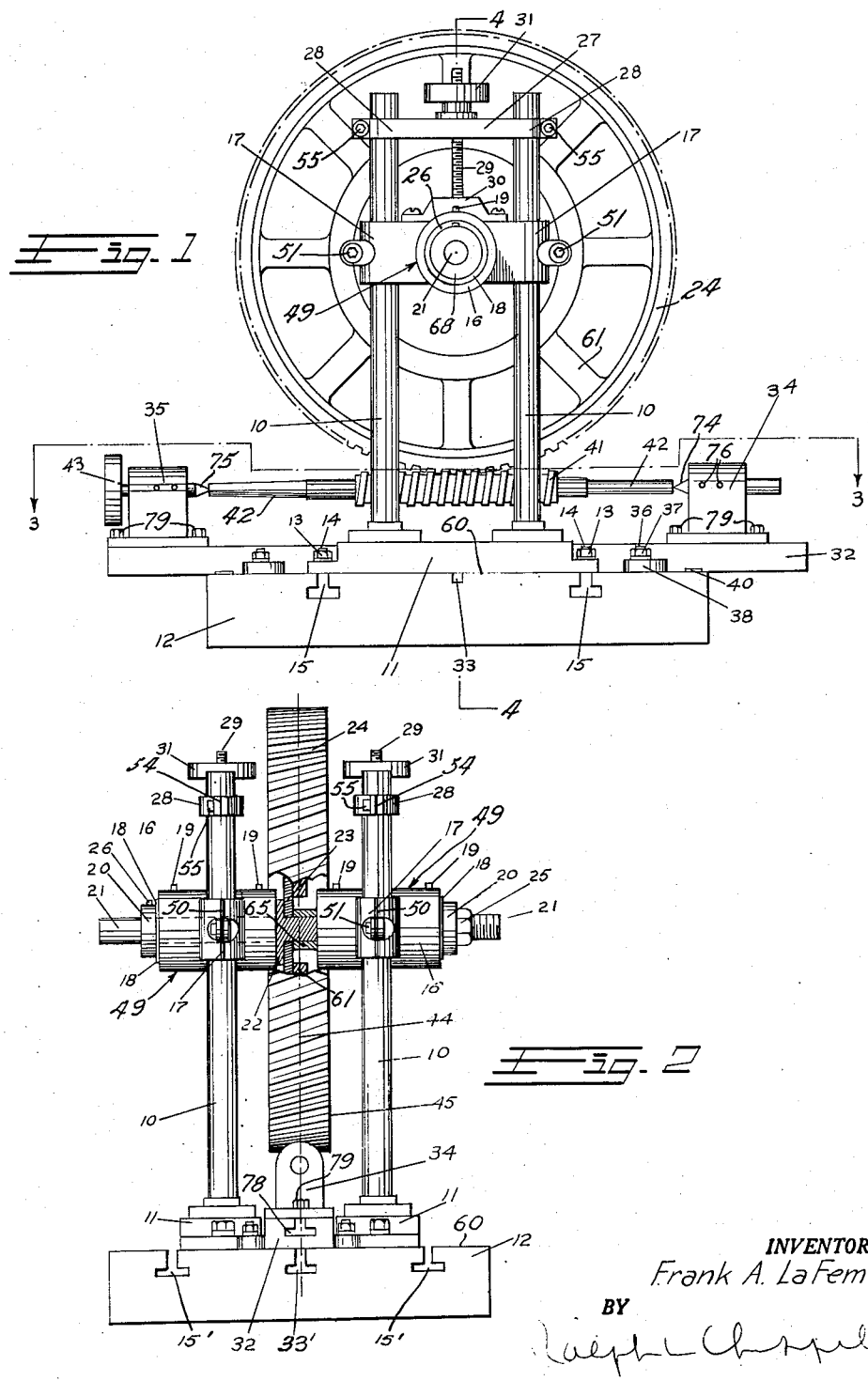
INVENTOR.
Frank A. La Femina
BY
ATTORNEY Feb. 16, 1954     F. A. LA FEMINA     2,669,028
GEAR CHECKING DEVICE
Filed Oct. 12, 1945     2 Sheets-Sheet 2
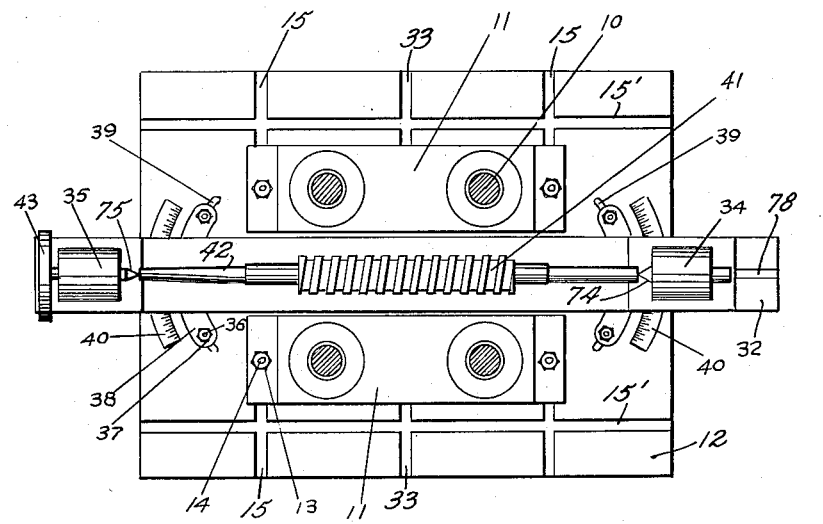
INVENTOR.
Frank A. La Femina
BY
ATTORNEY

UNITED STATES PATENT OFFICE 2,669,028

GEAR CHECKING DEVICE

Frank A. La Femina, New York, N. Y.

Application October 12, 1945, Serial No. 622,108

9 Claims. (Cl. 33—179.5)

(Granted under Title 35, U. S. Code (1952), sec. 266)

This invention relates to testing devices and more particularly to a device for checking the trueness of gears.

An object of this invention is to provide novel means for checking gears under actual running conditions.

Another object is to expedite the testing of gears.

A further object is to provide such accurate testing means for gears that the need for lapping said gears for final fit will be eliminated.

Further objects and advantages of this invention, as well as its construction, arrangement and operation, will be apparent from the following description and claims in connection with the accompanying drawings, in which, Figure 1 is a front elevation of a device embodying the present invention, Figure 2 is an elevation, partly in section, viewed from the right of Figure 1, Figure 3 is a cross-sectional plan, taken along the line 3—3 of Figure 1, Figure 4 is a cross-sectional elevation, taken through the gear center, as indicated by line 4—4 of Figure 1.

The device of the present invention comprises the base plate 12 that supports a gear being inspected. Under practice of the invention, a set of gears is mounted on the plate 12 with the gears of the set in meshing relationship. One of the gears of the set is under inspection. The other gear is known to be accurately machined, and preferably constitutes a master gear, made and used only for inspecting gears that are designed to mesh with it.

Each gear is supported on the plate 12 by a mounting individual to itself, the mounting including a bearing in which the gear rotates. The mounting serves to locate its gear in predetermined position relative to the base plate 12. The plate 12 thus serves as a base structure for supporting the several gears of the set in predetermined positions relative to each other, and provides a convenient datum for measuring the location of each gear relative to the plate, by this means, to measure the location of the several gears relative to each other.

Each mounting is suitable for the gear that it supports, different kinds of mountings being provided to accommodate certain different types of gears of different kinds of gearing.

One kind of mounting comprises the upright guide posts 10, attached to the base 11 to project upwardly therefrom in parallel relationship. A bearing for the gear, illustrated generally at 49, is detachably attached to the set of posts 10, and adjustably positionable lengthwise thereof. Pursuant to the purpose, each bearing 49 comprises the bearing housing 16 with the bracket members 17 projecting laterally therefrom. The brackets 17 are split at 50, Fig. 2, and each includes a set screw 51 for the bearing 49 to be clamped to a set of posts 10. A bushing 18 is secured in each housing 16 by means of set screws 19, and is machined to a predetermined inside diameter that locates the center of the bearing 49 midway between the posts 10.

The bearing 49 is suspended from the bracket comprising the crosspiece 27, having wing members 28 for attaching the bracket 27 to the pair of posts 10. Each wing member 28 is split at 54, and includes the set screw 55 for clamping it to a post 10. The bearing 49 is connected to its companion bracket 27 by means of the screw 29. The saddle or strap 30, that serves as the head of the screw 29 and accordingly is fixedly attached thereto, is attached to the bearing 49 by any suitable means. The screw 29 projects upwardly from the bearing 49, through the bore 57 of the cross piece 27, Fig. 4, and the thumb nut 31 is provided to traverse the screw 29 longitudinally of itself relative to the cross piece 27.

Under preferred practice, the nut 31 is graduated circumferentially with reference to an indicator line on the cross piece 27, to indicate the amount of adjustment of the bearing 49 towards or away from the cross piece 27. Screw 29 is preferably a micrometer screw, to enable adjustments to the bearing 49 to be read in increments of 0.001", and to enable fractions thereof to be estimated.

A mounting 10, 11 for a given bearing 49 is attached to the base plate 12 in any suitable manner. The preferred practice of the disclosed embodiment is to provide the base plate with parallel T-slots 15, that accommodate T-bolts 14 for clamping the base 11 to the base plate 12 by means of nuts 13. The keyway 33 is companion to the T-slots 15, and is positioned midway between the set of T-slots. The keyway 33 and T-slots 15 are precision machined to constitute a locating device that locates the center of a bearing 49 that is supported by a mounting 10, 11 precisely with reference to the top surface 60 of the plate 12.

The base plate 12 is provided with a plurality of sets of T-slots, and these are oriented in the face 60 of the plate 12 disposed at a predetermined angle with reference to each other. In the disclosed embodiment there is the pair of T-slots 15', Fig. 3, that are disposed at right angles to the T-slots 15. T-slot 33' is disposed midway between T-slots 15. T-slots 15 and 15' are available for an inspection set-up of a pair of gears that rotate in mesh on axes at right angles to each other. Most bevel gears and some helical gears come within this category, and are inspected with a set-up using a mounting 10, 11 for each gear of the gearing, respective mountings 10, 11 being attached to base 12 in right-angularly disposed sets of slots 15, 33 and 15', 33'.

For an inspection set-up of gears that rotate in mesh on parallel axes, a bearing mounting 10, 11 is provided for each gear of the set, the two mountings being attached to the base 12 in the same set of slots, either 15, 33 or 15', 33'. Such a set-up is used, for example, for spur gears, herringbone gears, and parallel helical gears.

The device of the present invention is also adapted for inspection of either the worm or the gear of worm gearing, and a set-up for a gear train of worm gearing is illustrated in the drawing as one practical application of the invention. Gear 24 is a helical gear that rotates in mesh with the worm 41 on axes at 90° with reference to each other. One object of the inspection is to determine the degree of accuracy of the helix angle.

In the example shown, the mounting for gear 24 provides two-bearing suspension, and two-bearing mounts 10, 11 are employed. These are attached to the base plate 12 in the same set of slots 15, 33, as shown in Figs. 2 and 4, which operates to position the two bearings 49 in coaxial alignment. The gear 24 being mounted between the bearings 49, on shaft 21.

The shaft 21 is provided with the abutment shoulder 22, Figs. 2 and 4, for locating the gear 24 properly positioned in the gear train. In the example shown the adaptor plate 23 is provided to adapt the gear 24 to the shaft 21, and the web 61 of the gear 24 is attached to the plate 23 by means of bolts 62. The adaptor plate 23 is held in abutting engagement with the shoulder 22 of shaft 21 by means of the spacer sleeve 65, the nut 25 being threaded to the shaft 21 for the purpose, and the washer 20 being interposed between the spacer sleeve 65 and the nut 25.

Bearing 49 at the left in Figs. 2 and 4 is located lengthwise of shaft 21 by its bushing 18 being held against shoulder 22 by means of locating collar 68. Set screw 26 secures locating collar 68 to shaft 21. Bearing 49 at the right in Figs. 2 and 4 is located lengthwise of shaft 21 by its bushing 18 being positioned in engagement with washer 20.

The bearing 49 at the left in Fig. 4 is adjustably positioned lengthwise of the T-slots 15. In this manner the center plane 44 of the gear 24 is located coincident with the axis of the worm 41. See Fig. 2. The preferred practice is to locate the center plane 44 of the gear 24 properly positioned relative to the center of the worm 41, by using the machined face 45 of gear 24 and measuring its position with reference to the precisely machined wall of cross-wise T-slot 33' of the plate 12 as a datum.

The base 32 is provided as a support for the worm 41, and is mounted rotatable to swing the axis of the worm 41 out of 90° relationship with the axis of the gear 24 for determining the accuracy of the helix angle of the gear being inspected. Accordingly, the base 32 is not keyed in the T-slot 33'. Instead the base plate 12 is provided with the socket 70, precisely centered with reference to the intersection of the keyways 33 and T-slot 33'. Plug 71 fits the socket 70, and projects downwardly from the bottom surface of the base 32 into bearing engagement with the socket 70. Thereby the base 32 is located for the center of worm 41 to intersect the vertical center plane 44 of gear 24 at its intersection with the vertical center plane of bearings 49, and base 32 can be swivelled out of right angle relationship with the vertical center plane of bearings 49.

The wing brackets 38, projecting from the sides of the base 32, carry the T-bolts 36 that fit in the arcuate T-slots 39 in the base 12, nuts 37 being operable for the T-bolts 36 to hold the base 32 at any adjusted position of rotation on the center of the plug 71. See Fig. 3. Arcuate graduated scales 40 are embedded in the surface 60 of the plate 12, to enable measurement of the amount that the base 32 is rotated out of right angle relationship with the keyway 33 and with the vertical center plane of bearings 49. T-slots 33', Fig. 2, are provided extending inwardly from the ends of the base 12 to intersect each with an arcuate T-slot 39 to enable the T-bolts 36 to be removed from the base plate 12 when the base 32 is removed therefrom.

The worm 41 is mounted to rotate on the centers 74 and 75, respectively carried by center stocks 34 and 35. T-slot 78 is disposed longitudinally of the base 32, and T-bolts 79 are operable to clamp the center stocks 34 and 35 onto the base 32. Stocks 34 and 35 are independently adjustably positionable longitudinally of the T-slot 78. The stocks 34 and 35 are adjustable towards and away from each other to position centers 74 and 75 with respect to each other properly spaced to provide a bearing for the worm 41, and the stocks 34 and 35 are adjustably positionable uniformly longitudinally of the T-slot 78 to locate the worm 41 for proper meshing engagement with the gear 24. Under the disclosed practice, the worm 41 is pressed on the arbor 42, which is bearinged on the centers 74 and 75 as shown.

Center 74 is a fixed center, i. e., it is fixed in the center stock 34 by means of set screws 76, Fig. 1. Center 75 is movable into and out of bearing engagement with the arbor 42, by rotation of the hand knob 43.

The inspection set-up shown in the drawing can be used for inspecting either the gear 24 or the worm 41 of worm gearing, in either case the other member being a master gear that is known to be accurate. The master member is used in the inspection set-up for inspecting each of a manufacturing lot of gears to determine its accuracy and to determine that the machining set-up continues to be accurate for the machining of subsequent pieces, or the inspection set-up may be used to inspect selected gears of a production lot to determine from time to time that the production set-up continues to be accurate.

The worm 41 is mounted in the inspection set-up for practice of the present invention by inserting the plug 71 of the base 32 in the socket 70 of the base plate 12, and then clamping base 32 on the base plate 12 by means of the T-bolts 36. The base 32 is adjustably rotated on the center of the plug 71 until it is positioned for the longitudinal axis of the worm 41 to be parallel with the keyway 33' as determined by the scales 40. This positions the axes of worm 41 and gear 24 at 90° with reference to each other, scales 40 being graduated to indicate a zero reading accordingly.

The teeth of either the worm 41 or the gear 24 are blued before they are placed in mesh, the preferred practice being to blue the member that is being inspected. The worm 41 and the gear 24 are brought into meshing engagement by the set screws 51 of the bearings 49 and the set screws 55 of the brackets 27 first being released. This enables each bearing 49, together with its bracket 27 as a unit, to be slid longitudinally of its supporting posts 10 until meshing engagement between the gear 24 and the worm 41 is approached. The preferred practice is to then tighten the set screws 55 of the brackets 27 only, when the worm 41 and gear 24 are positioned nearly in smooth meshing engagement, and to complete their adjustment into desired meshing engagement micrometrically by operating of the thumb nuts 31.

Micrometric adjustment of the bearings 49 is made by both thumb nuts 31 being operated until the worm 41 and gear 24 are in smooth meshing engagement with the desired degree of back-lash. Care must be exercised to adjust both nuts 31 uniformly, so that proper bearing alignment of the shaft 21 is maintained. A condition of proper bearing alignment exists when opposite ends of the shaft 21 are at the same height, and this is determinable by measurement using the surface 60 of the base plate 12 as a common datum.

Now the gearing is driven in mesh, for example by rotating the arbor 42 manually. If the worm 41 is being inspected, examination of the wear of its bluing will determine how accurately its threads have been machined. If the gear 24 is being inspected, examination of the wear of its bluing will determine how accurately its teeth have been machined, and it will also determine if the gear is uniform circumferentially. The distance is measured between the axes of centers 74, 75 and shaft 21, using the surface 60 of the base plate 12 as a common datum, to determine that the gear being inspected is machined for center-to-center dimension of design specification. The distance between the axes of centers 74, 75 and shaft 21 is set to conform with center-to-center dimension of design specification to determine that the gear being inspected is machined for proper back-lash.

After the gears have been rotated in mesh, the bluing may appear non-uniform lengthwise of the teeth of gear 24 and widthwise of the gear, i. e., the bluing may be off-center with reference to the center plane 44 of the gear 24. This indicates that the gear being inspected is machined inaccurately to the helix angle of design specifications. The condition is usually accompanied by the center-to-center distance between gears being greater than design specification. To determine the extent to which the helix angle is inaccurate, the base 32 is adjustably rotated on the center of the socket 70 until the bluing is symmetrically disposed with reference to the center plane 44 of the gear 24, the nuts 31 also being rotated to adjust the gearing for smooth meshing engagement. The graduated scales 40 can then be read to determine the extent of inaccuracy of the helix angle.

This present invention is simple to operate, is sturdy, and where the gears to be tested are not very large, it can be made in a size that will make portability feasible.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a gear inspection device, a main base, parallel supporting means arising from the main base, gear-shaft supporting means detachably secured at right angles to the parallel supporting means and adjustably positionable along the height of the parallel supporting means, a fine adjustment bracket slidably mounted on the parallel supporting means above the gear-shaft supporting means, screw-threaded means between the bracket and the gear shaft supporting means to vary and measure the vertical displacement of the gear-shaft supporting means, a swivel base pivotally secured to the main base between the parallel supporting means, adjustable tail centers detachably secured to the swivel base, and means for measuring the angular displacement of the swivel base secured to the main base.

2. In a gear inspection device, a main base, parallel supporting means arising from parallel horizontal platforms adjustably secured to the main base, gear-shaft supporting means detachably secured at right angles to the parallel supporting means and adjustably positionable along the height of the parallel supporting means, a fine adjustment bracket slidably mounted on the parallel supporting means above the gear-shaft supporting means, screw-threaded means between the bracket and the gear shaft supporting means to vary and measure the vertical displacement of the gear shaft supporting means, a swivel base pivotally secured to the main base between the parallel supporting means, adjustable tail centers detachably secured to the swivel base, and means for measuring the angular displacement of the swivel base secured to the main base.

3. In a device for inspecting gears or the like, a base plate comprising a datum surface describing a plane, a plurality of mountings each for supporting a gear of a set of gears on the base plate, each mounting comprising a bearing for its gear of the set, each mounting resting on the datum surface with the axis of its bearing parallel with the plane of the datum surface and comprising an attachment to secure the mounting to the base with the axis of its gear bearing located a predetermined distance away from the plane of the datum surface, one mounting comprising a guideway for its bearing directed away from the datum surface of the base for adjusting the position of its bearing towards and away from the datum surface, a securing device for the bearing of the mounting that embodies the guideway to hold the bearing in predetermined position of adjustment along the guideway.

4. In a device for inspecting gears and the like as defined in claim 3, the mounting that embodies the guideways comprising a traversing mechanism for traversing the bearing along the guideway.

5. In a device for inspecting gears or the like as defined in claim 4, the traversing mechanism including a measuring instrument for the linear distance that the bearing is adjusted along its guideway.

6. In a device for inspecting gears or the like as defined in claim 3, a second mounting comprising a pivot on an axis perpendicular to the plane of the datum surface of the base plate to rotate the axis of its gear bearing relative to the mounting to thereby adjust the relative angular relationship between the axes of the bearings of the several mountings.

7. In a device for inspecting gears and the like as defined in claim 6, the mounting that embodies the pivot comprising a scale for indicating the relative angular displacement between the axes of the bearings of the several mountings.

8. The method of inspecting gears that comprises mounting the several gears of a set of gears on a surface plate in position with reference to each other to rotate in meshing engagement in accordance with design specifications of the dimensions of the several gears of the set, adjusting the positions of the gears relative to each other with reference to the surface of the surface plate into relative positions of smooth meshing engagement, and measuring the displacement of adjustment of each gear with reference to the surface of the surface plate to determine the magnitude of departure from dimensions of design specifications of a gear of the set.

9. In the method of claim 8 as applied to gears of the helicoidal type, rotating the gears of the set with reference to each other on an axis perpendicular to the surface of the surface plate into adjustment of smooth meshing engagement, measuring the angular displacement of the rotary adjustment between gears to determine the magnitude of inaccuracy in the angle of the geometric curve of the teeth.

FRANK A. LA FEMINA.

References Cited in the file of this patent

UNITED STATES PATENTS

| Number | Name | Date |
| --- | --- | --- |
| 1,444,526 | Sauer | Feb. 6, 1923 |
| 1,624,415 | Logue | Apr. 12, 1927 |
| 1,909,088 | Bauer | May 16, 1933 |
| 2,296,894 | Bauer | Sept. 29, 1942 |
| 2,348,712 | Dahlerup | May 16, 1944 |
| 2,369,477 | Martin | Feb. 13, 1945 |
| 2,447,445 | Widen | Aug. 17, 1948 |

FOREIGN PATENTS

| Number | Country | Date |
| --- | --- | --- |
| 633,878 | Germany | Aug. 8, 1936 |
| 697,430 | Germany | Oct. 11, 1940 |

OTHER REFERENCES

American Machinist, February 18, 1943, pp. 97–98.